United States Patent [19]

Kondo

[11] 4,132,888
[45] Jan. 2, 1979

[54] DEVICE FOR AUTOMATICALLY FOCUSING IMAGE

[75] Inventor: Toshihiro Kondo, 2-14-3, Kamiishihara, Chofu-shi, Tokyo, Japan

[73] Assignees: Toshihiro Kondo, Chofu; Fuji Photo Film Co., Ltd., Minami-ashigara, both of Japan

[21] Appl. No.: 778,618

[22] Filed: Mar. 17, 1977

[30] Foreign Application Priority Data

Aug. 4, 1976 [JP] Japan .................. 51-92895
Mar. 17, 1976 [JP] Japan .................. 51-28835

[51] Int. Cl.² .............................. G01J 1/36
[52] U.S. Cl. ....................... 250/204; 250/201; 354/25
[58] Field of Search ............. 250/201, 204, 209; 356/4, 5, 125; 354/25, 31, 163

[56] References Cited

U.S. PATENT DOCUMENTS

| 3,054,898 | 9/1962 | Westover et al. | 356/4 |
| 3,682,071 | 8/1972 | Hosoe | 356/4 |
| 3,844,658 | 10/1974 | Gela et al. | 250/201 |
| 3,953,729 | 4/1976 | Hosoe et al. | 354/25 |
| 4,047,022 | 9/1977 | Holle | 250/201 |

Primary Examiner—David C. Nelms

[57] ABSTRACT

Behind an objective which is axially movable, is provided a beam splitter to divide the light path passing through the objective into two light paths. In one of the light paths on the image plane of the objective is located a prism. Behind the prism is provided a photodetector in the optical path including the prism. In the optical path which does not have the prism also is provided a photodetector at a position which is optically conjugate with the other photodetector. The output of the photodetectors are connected to an output comparing circuit which is connected to a servomotor for controlling the position of the objective. When the outputs of the two photodetectors are equal to each other, the servomotor is stopped.

8 Claims, 35 Drawing Figures

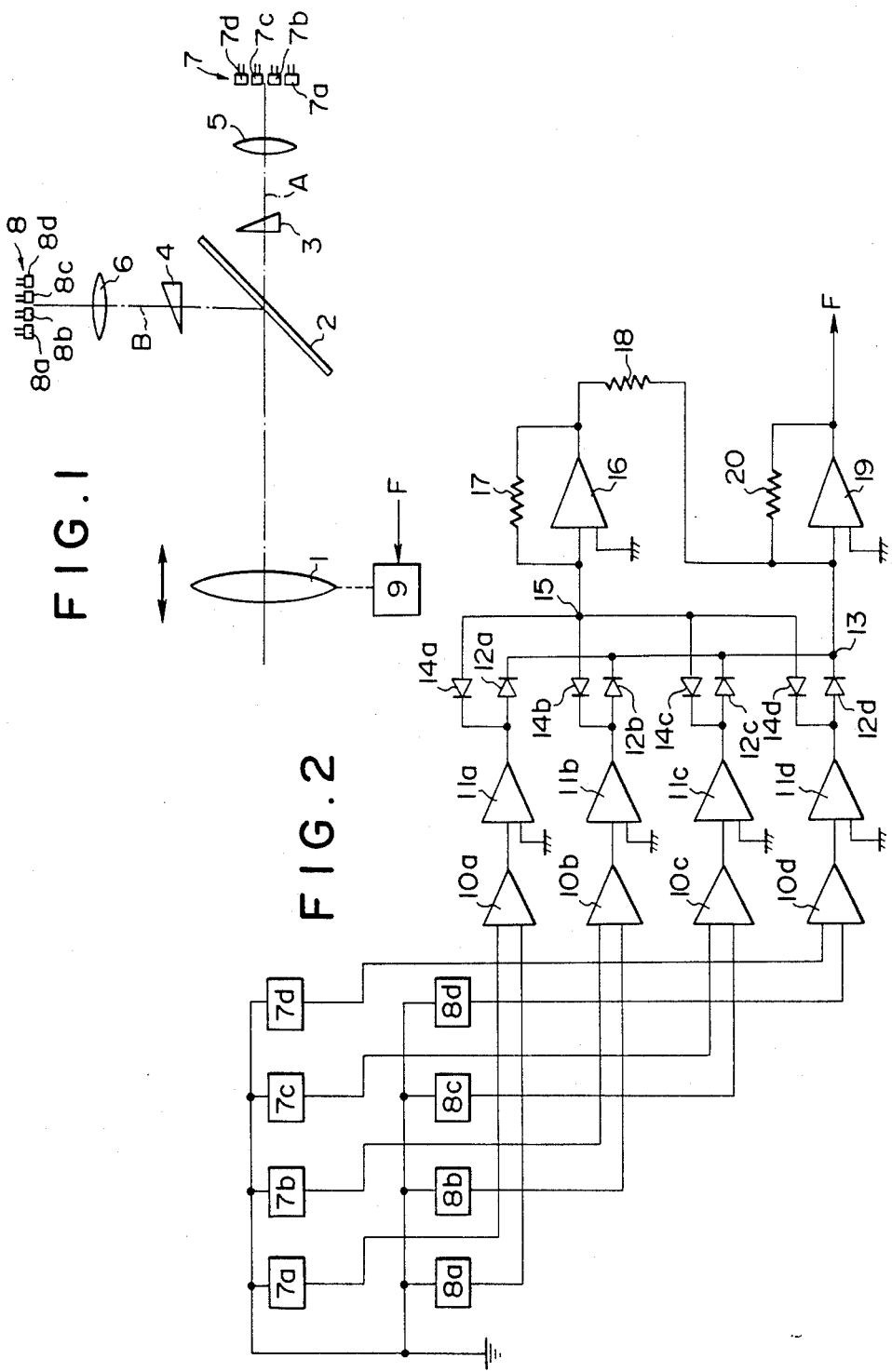

FIG.3A
FIG.3B
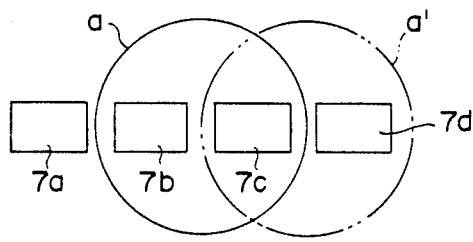
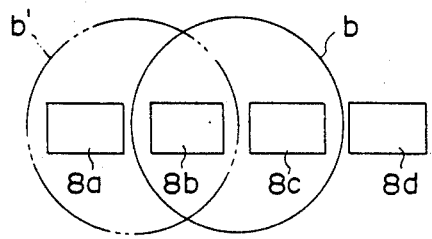
FIG.4
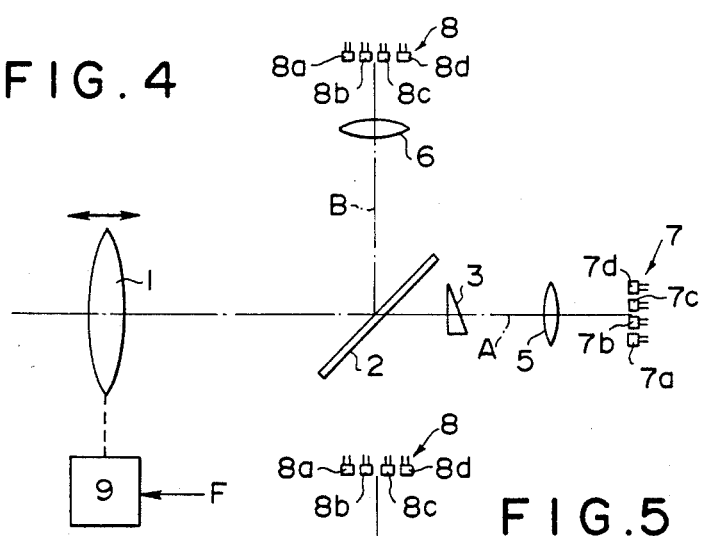
FIG.5
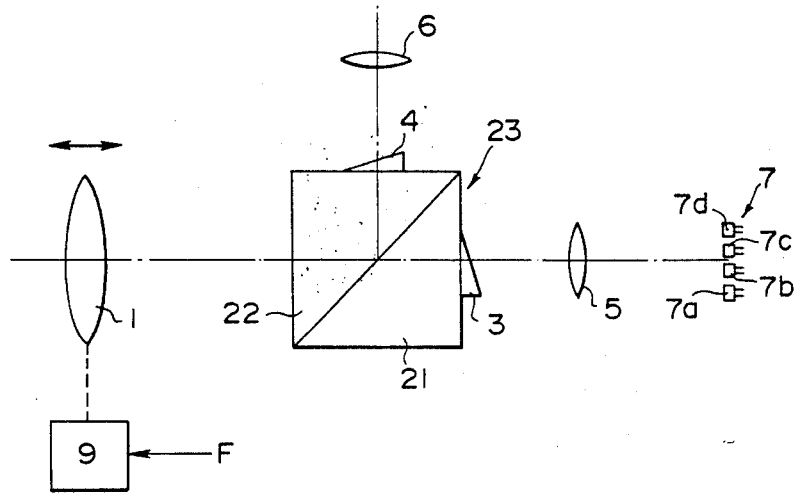

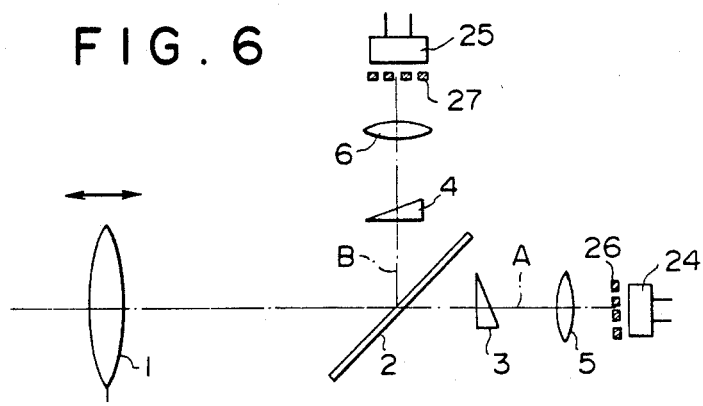
FIG. 6
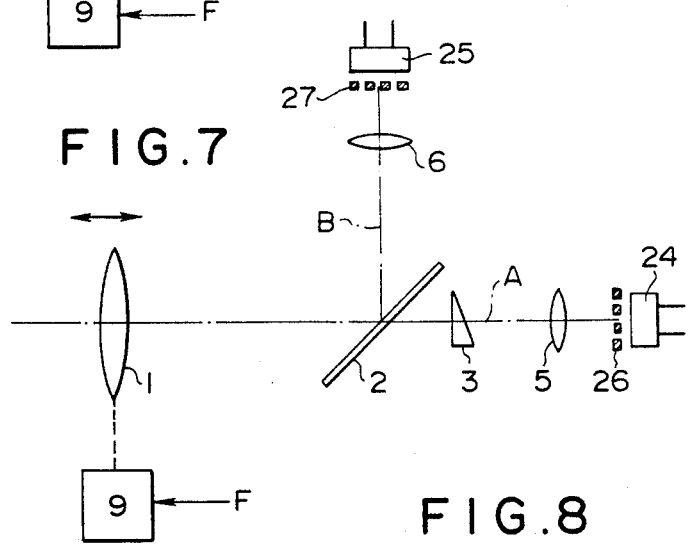
FIG. 7
FIG. 8
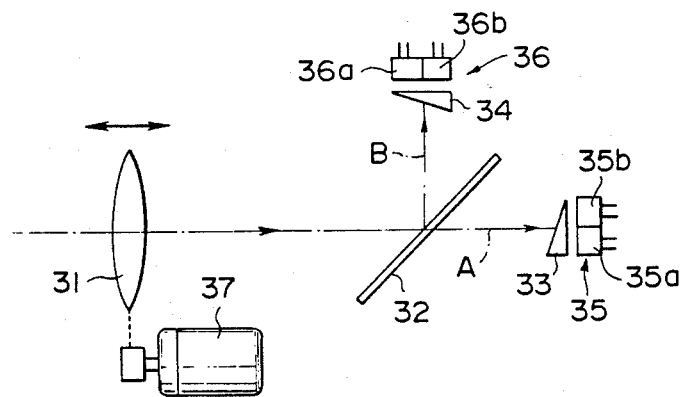

122a  122b 123a  123b

DEVICE FOR AUTOMATICALLY FOCUSING IMAGE

BACKGROUND OF THE INVENTION

1. Field of the Invention

This invention relates to an automatic image focusing device for optical instruments such as photographic cameras, and more particularly to a device for automatically focusing an image focused by an objective in a single lens reflex camera or the like.

2. Description of the Prior Art

It has been known in the art to automatically focus an image in a photographic camera. In most of the conventional automatic image focusing device, a photodetector is located substantially on the image plane of an object of the optical instrument like a camera and the objective is moved back and forth along the optical axis thereof to find the extreme value of the output of the photodetector. When the focusing plane or the image plane of the objective is aligned with the photodetector, the output of the photodetector is maximized. The output of the photodetector is transmitted to a lens control means and the axial position of the objective is controlled to focus an image on the photodetector in accordance with the output of the photodetector.

The above described automatic image focusing device has a defect in that the variation in the output of the photodetector is slow and the extreme value thereof must be detected and accordingly the focus control cannot be quickly conducted. Particularly, since the extreme output cannot be detected unless the objective is moved back and forth around the focusing position to find the extreme value, it is impossible to know whether the image is best focused at a properly selected position.

SUMMARY OF THE INVENTION

It is the primary object of the present invention to provide a device for automatically focusing an image in an optical instrument having an objective in which it is possible to know whether the image is best focused or not at any position.

Another object of the present invention is to provide a device for automatically focusing an image in an optical instrument having an objective in which the focus is quickly detected.

Still another object of the present invention is to provide a device for automatically focusing an image which is of simple structure and accordingly can be manufactured at a low cost.

The automatic image focusing device in accordance with the present invention is characterized in that the light passing through the objective is divided into two optical paths at least in one of which is provided a refraction optical element such as a prism substantially at the image plane of the objective and in both of said optical paths are provided photodetectors. The two optical paths are provided therein with a pair of photodetectors, one in each optical path. The pair of photodetectors are of the equivalent characteristics. The photodetectors are located behind the refraction optical element in the optical path in which there is provided the refraction optical element. Between the refraction optical element and the photodetector may be inserted a focusing lens when the photodetector is located apart from the refraction optical element. When both the two optical paths are provided with the refraction optical elements, the refraction optical elements are provided in such a manner that the light distribution on the two photodetectors is moved in the opposite directions as the image plane is displaced from the refraction optical elements. In a preferred embodiment, the photodetector is located directly behind the refraction optical element close thereto and the focusing lens is provided therebetween.

When the image plane is displaced from the refraction optical element as the objective is moved back and forth, the image focused by the objective is not focused on the refraction optical element and accordingly the light distribution on the photodetector is shifted laterally. Since the refraction optical element or elements are provided in such a manner that the light distribution on one photodetector is moved in the direction opposite to that of the movement of the light distribution on the other photodetector as the image plane is displaced from the refraction optical element, the output of the two photodetectors is changed in the different way as the image plane is displaced from the refraction optical element. When the image plane is on the refraction optical element, the output of the two photodetectors becomes equal to each other.

In preferred embodiments, there is provided a slit in front of the photodetector to amplify the movement or change in the light distribution on the photodetector. Alternatively, a plurality of photodetector elements are arranged in one optical path and the same number of photodetector elements are arranged in the other optical path in the positions corresponding to those of said plurality of photodetector elements.

BRIEF DESCRIPTION OF THE DRAWING

FIG. 1 is a schematic side view showing the optical system of an embodiment of the automatic focusing device in accordance with the present invention, FIG. 2 is a circuit view showing an example of an electric circuit used in one embodiment of the present invention, FIGS. 3A and 3B are explanatory views showing the relationship of the photodetectors used in one embodiment of the invention and the image focused thereon, FIG. 4 is a side view showing the optical system of another embodiment of the invention, FIG. 5 is a side view showing the optical system of still another embodiment of the invention, FIG. 6 is a side view showing the optical system of still another embodiment of the invention, FIG. 7 is a side view showing the optical system of still another embodiment of the invention, FIG. 8 is a side view showing the optical system of a further different embodiment of the present invention in which focusing lenses are not employed in front of the photodetectors.

DESCRIPTION OF THE PREFERRED EMBODIMENTS

Figure 9:
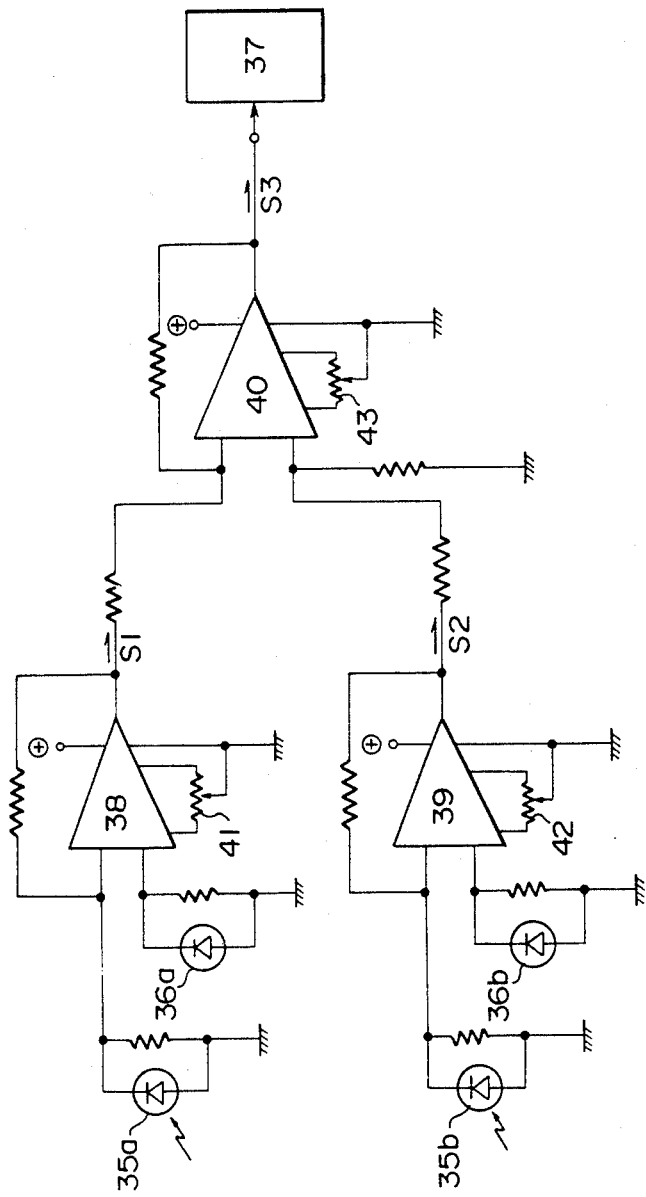
FIG. 9 is a circuit view showing another example of the electric circuit used in the device of the present invention.

A preferred embodiment of the present invention will now be described in detail with reference to FIGS. 1, 2 and 3A-3C. An objective 1 is provided to move back and forth along the optical axis thereof as indicated by an arrow. The light passing through the objective 1 is divided by a half transparent mirror 2. In the optical path A of the light passing through the half mirror 2 is located a prism 3, and in the optical path B of the light reflected by the mirror 2 is located a second prism 4. The prisms 3 and 4 are so oriented that the light is refracted in the opposite directions thereby with respect to the image formed by the objective. Behind the first prism 3 is located a focusing lens 5 to focus an image on a plurality of photodetector elements 7a-7d constituting a first photodetector 7. Behind the second prism 4 is located a focusing lens 6 to focus an image on a plurality of photodetector elements 8a-8d of a second photodetector 8. The image formed by the objective 1 is first focused on the prisms 3 and 4 and then focused on the photodetector groups 7 and 8. The photodetectors groups 7 and 8 are in the positions which are optically conjugate with each other in which the respective photodetector elements 7a, 7b, 7c and 7d correspond to elements 8a, 8b, 8c and 8d. The objective 1 is connected to a control circuit 9 including a servomotor which is controlled by a focusing signal F.

FIG. 2 shows a signal treating circuit connected with the photodetector groups 7 and 8. The corresponding photodetector elements 7a and 8a are connected with the input terminals of a first amplifier 10a so that the difference between the two outputs will be amplified by the amplifier 10a. The output of the amplifier 10a is put into one input of a second amplifier 11a the other input of which is grounded. The output of the second amplifier is connected with the anode of a first diode 12a the cathode of which is connected to a first adding point 13. The output of the second amplifier 11a is further connected with a cathode of a second diode 14a the anode of which is connected to a second adding point 15. Similarly, first amplifiers 10b-10d and second amplifiers 11b-11d are connected to the photodetector elements 7b-7d and 8b-8d and the output thereof is connected to said adding points 13 and 15 by way of similar diodes 12b-12d and 14b-14d, respectively as shown. The second adding point 15 is connected to the first input terminal of an inverse amplifier 16 the output of which is fed back to its first input terminal by way of a feed back resistor 17 and connected to the first input terminal of another amplifier 19 by way of a resistor 18. Said first adding point 13 is also connected to the first input terminal of the latter amplifier 19. The output of the amplifier 19 is fed back to its first input terminal by way of a feed back resistor 20 and is also taken out as a focusing signal F used to control said objective lens control circuit 9.

The operation of the above described emobiment will be described hereinbelow referring to FIGS. 3A and 3B. When the image formed by the objective 1 is focused just on the prisms 3 and 4, the images formed on the photodetector groups 7 and 8 by the focusing lenses 5 and 6 are at the corresponding positions on the photodetector elements 7a-7d and 8a-8d, for instance on elements 7b and 7c, and 8b and 8c, respectively as shown. In FIGS. 3A and 3B, the images are indicated by a and b. In more detail, for instance, the bright portion in the shape of circle of the image is indicated by the reference characters a and b. In this case, the outputs of the corresponding photodetector elements are of the same level, and accordingly the outputs of the amplifiers 11a-11d are all zero. Therefore, the output signal F is of the lowest level, which stops the driving of the servomotor (not shown) in the control circuit 9 so that the objective 1 is stopped in its position.

When the image on the prisms 3 and 4 is out of focus, the images formed on the photodetector groups 7 and 8 are displaced in the opposite directions from said positions a and b as shown in FIGS. 3A and 3B by a' and b'. Since the bright portion of the image is displaced from a to a', the output of the element 7b is lowered and the output of the element 7d is increased. On the other hand, the output of the element 8c is lowered and the output of the element 8a is increased, since the bright portions a and b are moved in the opposite directions. Thus, the outputs of the amplifiers 11a-11d are all changed to a higher level. When the output of the amplifiers 11a-11d is of negative value, the negative output is converted to a positive output through the diode 14a-14d and the inverse amplifier 16. The amplified output from the amplifier 16 is added to the output collected at the adding point 13. The sum of the outputs from the amplifier 16 and the adding point 13 is given as the focusing signal F through the amplifier 19.

Though in the above described embodiment both optical paths A and B divided by the mirror 2 are provided with the prism 3 or 4, one of the prisms 3 and 4 can be eliminated as shown in FIG. 4. In the embodiment shown in FIG. 4, only the optical path A is provided with a prism 3, and the other optical path B is not provided with a prism. In this embodiment, the degree of the change in the output obtained is not so large as that obtained in the foregoing embodiment.

Though in the above described embodiments, a half transparent mirror 2 has been employed, it may be replaced by a beam splitter made of a pair of cemented prism blocks as shown in FIG. 5. In the embodiment as shown in FIG. 5, a pair of triangular prisms 21 and 22 cemented together constitutes a beam splitter 23. Prisms 3 and 4 are cemented on the faces thereof as shown.

In the above described embodiments, each photodetector comprises a plurality of photodetector elements. However, the plurality photodetector elements may be substituted for by a single photodetector and a slit located in front thereof. For instance, as shown in FIG. 6, the photodetector group 7 may be replaced by a single photodetector 24 and a slit plate 26 located in front thereof. The slit plate 26 has a plurality of parallel slits. The slit 26, however, may be replaced by a slit plate having only one slit which extends in the direction lateral to the direction in which the image is moved thereon when the focal plane of the image is moved axially back and forth along the optical path of the objective. In case that the embodiment as shown in FIG. 6 is used, the amplifiers 10a-10d and 11a-11d may not all be employed but only one set of amplifiers 10a and 11a is enough.

In the embodiment as shown in FIG. 6, too, one of the prisms 3 and 4 may be eliminated as shown in FIG. 7. In both embodiments shown in FIGS. 6 and 7, the output of the final amplifier 11a is most lowered when the image is focused just on the prisms 3 and 4 or the prism 4.

In the above described embodiments as shown in FIGS. 1 to 7, focusing lenses 5 and 6 are inserted between the prisms 3 and 4 and the photodetector groups or photodectors 7 and 8, respectively. Therefore, there is needed a large space behind the prisms 3 and 4. In order to make the size of the camera including the image focusing device as small as possible, it is preferred to eliminate the focusing lenses 5 and 6. FIG. 8 shows one example of such a device that does not have a focusing lens between the prism and the photodetector.

Referring to FIG. 8, similarly to the embodiment shown in FIGS. 1 to 7, an objective 31 is connected to a servomotor 37 which is controlled by an electric signal from a circuit connected to photodetectors 35a, 35b, 36a and 36b to be moved back and forth along the optical axis thereof. The light passing through the objective 31 is divided into two optical paths A and B by a half transparent mirror 32. In the optical path A is located a first prism 33 and just therebehind is located a pair of photodetector elements 35a and 35b constituting a photodetector pair 35. On the optical path B is located a second prism 34 and just therebehind is located a second photodetector pair 36 composed of a pair of photodetector elements 36a and 36b. In this embodiment, as the photodetector elements are employed photovoltaic type photodetectors such as photodiodes. The elements 35a, 35b, 36a and 36b are arranged in the direction in which the image focused by the objective is moved as the focal plane of the image is moved axially back and forth along the optical axis thereof.

FIG. 9 shows an example of a control circuit connected between the photodetector elements 35a to 36b and the servomotor 37. Referring to FIG. 9, the photodetector elements 35a and 36a corresponding to each other in the photodetector pairs 35 and 36 are connected to the input terminals of an operational amplifier 38 to amplify the difference between the outputs of the photodetector elements 35a and 36a. In the same manner, the photodetector elements 35b and 36b are connected to the input terminals of an operational amplifier 39. The outputs of the two operational amplifiers 38 and 39 are connected to the input terminals of another operational amplifier 40. The output S1 from the amplifier 38 and the output S2 from the amplifier 39 are input into the amplifier 40 and the final output S3 is obtained by the amplifier 40 which is used to control the servomotor 37. The operational amplifiers 38, 39 and 40 are provided with variable resistors 41, 42 and 43 so that the outputs S1, S2 and S3 thereof may respectively be zero when the two inputs given thereto are of the same level.

Figure 10A:
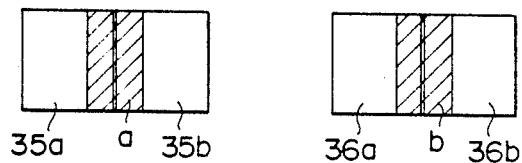
FIGS. 10A to 10C are explanatory views showing the relationship of the photodetectors used in the embodiment as shown in FIG. 8 and the image focused thereon.
Figure 10B:
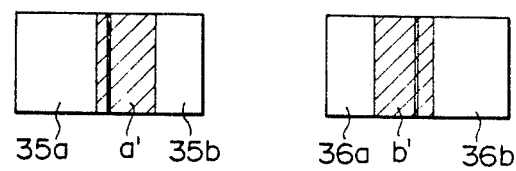
Figure 10C:
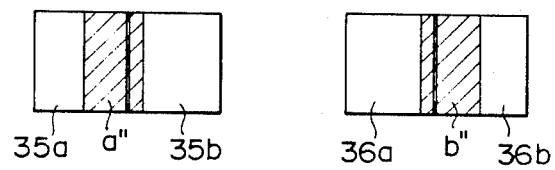

Now the operation of the embodiment as shown in FIGS. 8 and 9 will be described with reference to FIGS. 8, 9 and 10A-10C. FIGS. 10A to 10C show the relationship between the position of the images and the photodetector elements 35a, 35b, 36a and 36b on which the images are formed. When the images formed by the objective 31 are just focused on the prisms 33 and 34 and accordingly on the photodetector pairs 45 and 36, the dark portion of the images is formed for instance at the middle of the pairs as shown in FIG. 10A. In FIG. 10A, the hatched part a shows the dark portion of the image formed on the photodetector elements 35a and 35b. Since the dark portions a and b are at the center of the pairs 35 and 36, the output of the first element 35a of the first pair 35 is equal to that of the first element 36a of the second pair 36, and the output of the second element 35b of the first pair 35 is equal to that of the second element 36b of the second pair 36. Therefore, the outputs S1 and S2 are zero, and accordingly the output S3 is also zero. Thus, when the image is focused right on the prisms 33 and 34, the servomotor 37 is not driven and the objective 31 is not moved. Then, when the image is moved out of focus, the light is refracted by the prisms 33 and 34 in the opposite directions as shown in FIG. 10B. The dark portion on the photodetector pair 35 is moved to the right as shown by a' and that on the other pair 36 is moved to the left as shown by b'. Therefore, the output of the first element 35a of the first pair 35 is increased and that of the first element 36a of the second pair 36 is decreased, and the output of the second element 35b of the first pair 35 is decreased and that of the second element 36b of the second pair 36 is increased. Consequently, the output S1 is increased and the output S2 is lowered, and accordingly the output S3 is increased and the servomotor 37 is rotated in one direction. When the image is moved in the opposite direction on the photodetectors, the output S3 is decreased to rotate the servomotor 37 in the opposite direction.

Figure 11A:
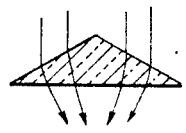
FIGS. 11A–11C, 13A–13C, 15A–15C and 17A–17D are sectional views of various examples of the refraction optical element which can be used in the present invention.
Figure 13A:
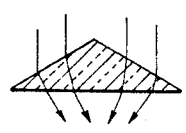
Figure 11B:
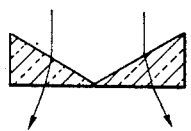
Figure 13B:
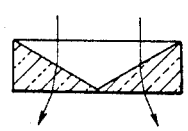
Figure 11C:
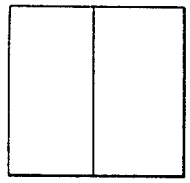
Figure 13C:
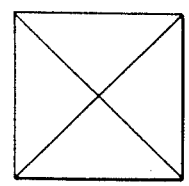
Figure 12:
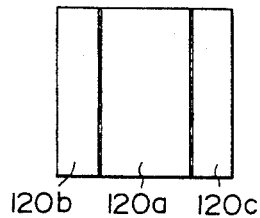
FIGS. 12, 14, 16 and 18 are plan views of the photodetectors used in combination with the refraction optical elements as shown in FIGS. 11A–11C, 13A–13C, 15A–15C and 17A–17D.
Figure 14:
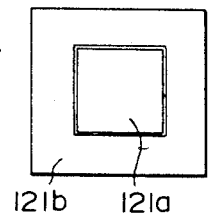
Figure 15A:
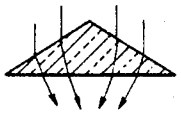
Figure 15B:
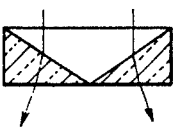
Figure 15C:
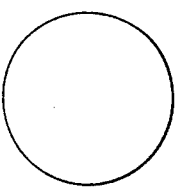
Figure 16:
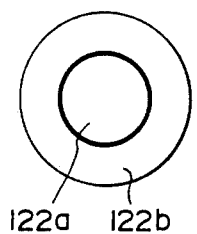
Figure 17A:
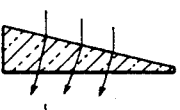
Figure 17B:
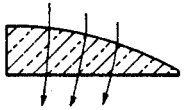
Figure 17C:
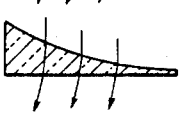
Figure 18:
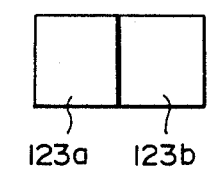
Figure 17D:
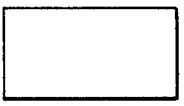

In the above described embodiments, a normal prism like an optical wedge is used as the refraction optical element on which the image if focused. However, the shape of the prism may be of any kind as shown in FIGS. 11A-11C, 13A-13C, 15A-15C and 17A-17D. FIGS. 11A and 11B are sectional views of triangular prisms having a triangular section or a combination of two triangular sections, the plan view of which is shown in FIG. 11C. In combination with the prisms as shown in FIGS. 11A to 11C, a set of photodetectors 120a, 120b and 120c is employed. The central photodetector 120a and the two outside photodetectors 120b and 120c are electrically independent of each other. The outside photodetectors 120b and 120c are joined together to form an electrically single photodetector. The area of the central photodetector 120a and the total area of the outside photodetectors 120b and 120c are made equal to each other. FIG. 13A shows another example of the prism which has a pyramid shape, and FIG. 13B shows another example which has a pyramid shaped recess. FIG. 13C is a plan view of these prisms. FIG. 14 shows a photodetector assembly used in combination with the prisms as shown in FIGS. 13A to 13C. In the photodetector assembly, a square central photodetector element 121a is surrounded by a large photodetector element 121b. FIGS. 15A and 15B show similar prisms which are in the shape of a cone and a disc having a cone shaped recess. FIG. 15C is a plan view of the prisms shown in FIGS. 15A and 15B. FIG. 16 is a plan view of the photodetector assembly used in combination with the prisms as shown in FIGS. 15A to 15C, in which a circular central photodetector 122a is surrounded by an annular photodetector 122b. FIG. 17A shows a prism like the one used in the foregoing embodiments of the invention. FIG. 17B shows a prism having a convex face, and FIG. 17C shows a prism having a concave face. FIG. 17D is a plan view thereof. FIG. 18 shows a photodetector assembly used in combination with the prisms as shown in FIGS. 17A to 17D, in which two photodetectors 123a and 123b are arranged adjacent to each other.

Figure 19:
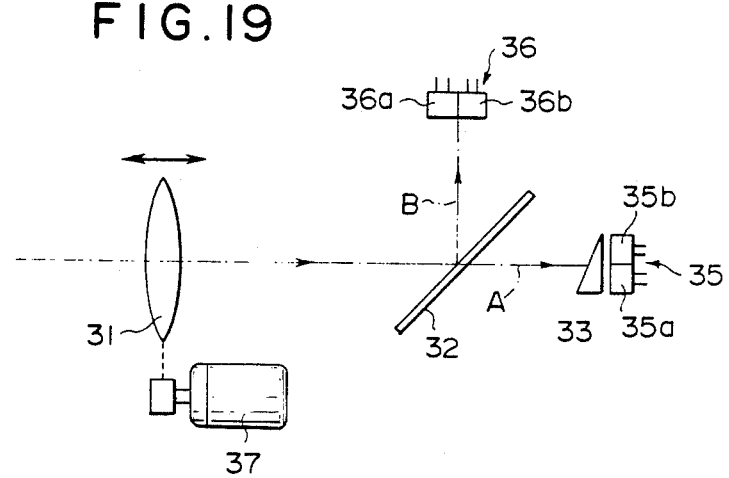
FIG. 19 is a side view showing the optical system of still another embodiment of the present invention.

In the aforedescribed embodiment as shown in FIG. 8, prisms 33 and 34 are provided in both optical paths A and B. However, similarly to said embodiment as shown in FIG. 4, one prism 34 may be eliminated as shown in FIG. 19.

Figure 20:
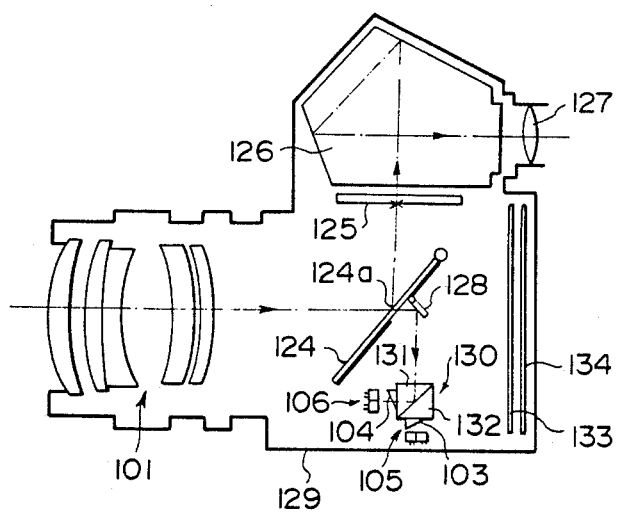
FIG. 20 is a side sectional view of a single lens reflex camera in which the device in accordance with this invention is employed.
Figure 21:
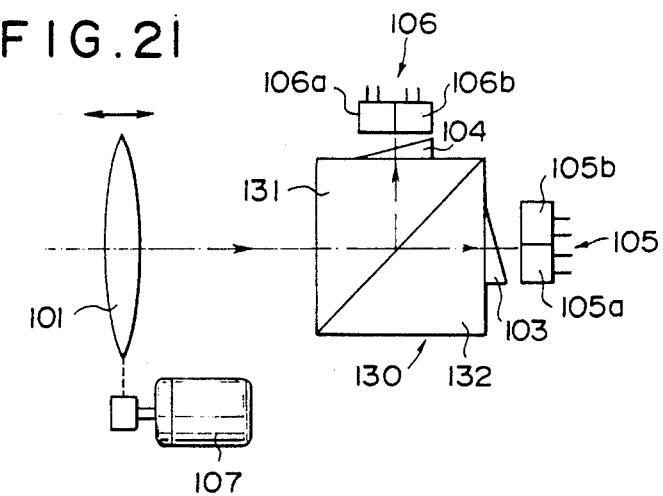
FIGS. 21 to 23 are side views showing optical systems of further different embodiments of the present invention.

FIG. 20 shows an example of a single lens reflex camera in which the optical system for the automatic image focusing device in accordance with an embodiment of the present invention as shown in FIG. 21 is incorporated. An objective 101 composed of a number of lenses is provided in the lens barrel of the camera and made axially movable back and forth for focusing. Behind the objective 101 is obliquely provided a swing-up mirror 124 to reflect the light from the objective 101 upward to a focusing plate 125. Above the focusing plate 125 is provided a pentagonal dach prism 126 and an eyepiece 127 as is well known in the art. The swing-up mirror 124 is provided at the center thereof with a half transparent portion 124a to partially pass the light from the objective 101. Behind the half transparent portion 124a of the mirror 124 is located a small mirror 128 which is pivotally mounted on the back of the mirror 124. The small mirror 128 is folded in the position to close the half transparent portion 124a of the mirror 124 to prevent the ambient light from invading into the camera through the half transparent portion 124a when the mirror 124 is swung up upon depression of a shutter release button. The light reflected by the small mirror 128 is incident upon a beam splitter 130 located under the small mirror 128. The beam splitter 130 is composed of a pair of prisms 131 and 132 cemented together. On the exit faces thereof are cemented a pair of prisms 103 and 104, respectively. Behind the prisms 103 and 104 are located a pair of photodetector pairs 105 and 106 as said photodetector pairs 35 and 36, respectively.

The optical system employed in the embodiment shown in FIG. 20 is illustrated in detail in FIG. 21. The objective 101 simply illustrated in FIG. 21 is controlled by a servomotor 107 which is driven by a control signal from a circuit including said photodetector pairs 105 and 106 as said circuit as shown in FIG. 9.

Figure 22:
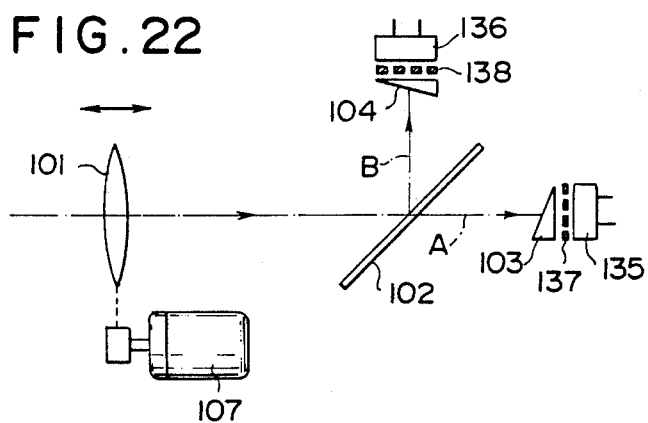
Figure 23:
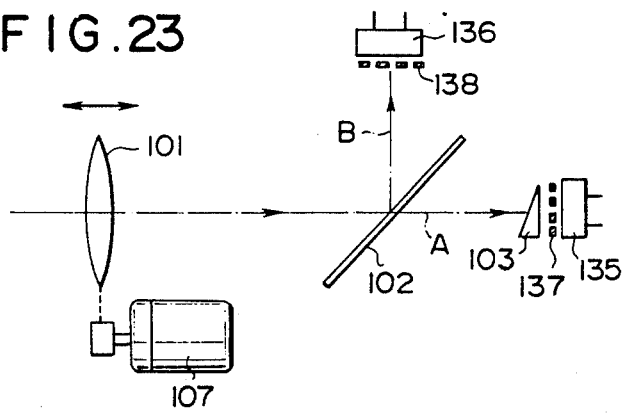

As said embodiments shown in FIGS. 6 and 7, the photodetector pairs 105 and 106 may be replaced by a pair of single photodetectors 135 and 136 and a pair of slit plates 137 and 138 as shown in FIGS. 22 and 23. In FIGS. 22 and 23, the reference numeral 102 indicates a half transparent mirror to divide the light from the objective 101 into two optical paths A and B. In FIG. 23, one prism 104 is eliminated as said embodiment shown in FIG. 7. In the embodiments as shown in FIGS. 22 and 23, there are employed only two photodetectors 135 and 136. Therefore, in the circuit as shown in FIG. 9, one hand of the circuit which is used to obtain one of the two outputs S1 and S2 can be eliminated.

I claim:

1. A device for automatically focusing an image in an optical instrument including an objective comprising an axially movable objective, means for axially moving said objective in accordance with an electric focusing signal given thereto, means for dividing the optical path of the light passing through the objective into two optical paths located before the image plane of the objective, a refraction optical element located substantially on said image plane in one of said two optical paths, a first focusing means located behind said refraction optical element to form an image of the image focused on said image plane onto a second image plane on said optical path, a first photodetector means located on said second image plane on which said image is focused by said first focusing means, a second focusing means located behind the image plane in the other optical path to form an image of the image focused on said image plane onto a second image plane on said the other optical path, a second photodetector means located on said second image plane on which said image is focused by said second focusing means, means connected with said first and second photodetector means for comparing the output of said first photodetector means with that of said second photodetector means, and means connected with said comparing means for generating said electric focusing signal for driving said objective moving means to move the objective up to the position where the output of said first photodetector means becomes equal to that of said second photodetector means.

2. A device for automatically focusing an image as defined in claim 1 wherein each said first and second photodetector means comprises a plurality of photodetector elements arranged in the direction perpendicular to the optical path, the number of said photodetector elements of said first photodetector means being equal to that of said photodetector elements of said second photodetector means, said output comparing means comprises a plurality of comparing means elements of the same number as that of said photodetector elements, each said comparing means element being connected with one of said photodetector elements of said first photodetector means and one of said photodetector elements of said second photodetector means corresponding to said one of said photodetector elements in said first photodetector means to compare the outputs of said corresponding photodetector elements.

3. A device for automatically focusing an image as defined in claim 1 wherein said first and second photodetector means each comprises a single photodetector and a slit plate located in front thereof, said slit plate having at least one slit extending in the direction perpendicular to the direction in which the image focused on the photodetector is moved as said objective moves back and forth along the optical axis thereof.

4. A device for automatically focusing an image as defined in claim 1 further comprising a second refraction optical element located substantially on the image plane in the other optical path, said second refraction optical element and said first refraction optical element refracting the light in the opposite direction with respect to the image formed thereon.

5. A device for automatically focusing an image in an optical instrument including an objective comprising an axially movable objective, means for axially moving said objective in accordance with an electric focusing signal given thereto, means for dividing the optical path of the light passing through the objective into two optical paths located before the image plane of the objective, a refraction optical element located substantially on said image plane in one of said two optical paths, a first photodetector means located immediately behind said refraction optical element, a second photodetector means located on said image plane in the other optical path, means connected with said first and second photodetector means for comparing the output of said first photodetector means with that of said second photodetector means, and means connected with said comparing means for generating said electric focusing signal for driving said objective moving means to move the objective up to the position where the output of said first photodetector means becomes equal to that of said second photodetector means.

6. A device for automatically focusing an image as defined in claim 5 wherein each said first and second photodetector means comprises a plurality of photodetector elements arranged in the direction perpendicular to the optical path, the number of said photodetector elements of said first photodetector means being equal to that of said photodetector elements of said second photodetector means, said output comparing means comprises a plurality of comparing means elements of the same number as that of said photodetector elements, each said comparing means element being connected with one of said photodetector elements of said first photodetector means and one of said photodetector elements of said second photodetector means corresponding to said one of said photodetector elements in said first photodetector means to compare the outputs of said corresponding photodetector elements.

7. A device for automatically focusing an image as defined in claim 5 wherein said first and second photodetector means each comprises a single photodetector and a slit plate located in front thereof, said slit plate having at least one slit extending in the direction perpendicular to the direction in which the image focused on the photodetector is moved as said objective moves back and forth along the optical axis thereof.

8. A device for automatically focusing an image as defined in claim 5 further comprising a second refraction optical element located substantially on the image plane in the other optical path, said second refraction optical element and said first refraction optical element refracting the light in the opposite direction with respect to the image formed thereon.

* * * * *